United States Patent
Chang

(10) Patent No.: US 6,334,255 B1
(45) Date of Patent: Jan. 1, 2002

(54) SHEARS CAPABLE OF CUTTING SIMULTANEOUSLY A PLURALITY OF OBJECTS OF DIFFERENT DIMENSIONS AND PROFILES

(76) Inventor: Chih-Min Chang, No. 10, Chin Tun Lane, Chin Tun Village, Hua Tan Hsian, Chang Hua Hsien (TW)

( * ) Notice: Subject to any disclaimer, the term of this patent is extended or adjusted under 35 U.S.C. 154(b) by 0 days.

(21) Appl. No.: 09/558,548

(22) Filed: Apr. 26, 2000

(51) Int. Cl.⁷ .................................................. B26B 17/02
(52) U.S. Cl. ................... 30/252; 30/131; 30/191; 30/250; 7/133; 7/134
(58) Field of Search .................. 30/123, 131, 142, 30/191, 252, 262, 258, 250, 242, 192; 7/133, 134

(56) References Cited

U.S. PATENT DOCUMENTS

| | | | | |
|---|---|---|---|---|
| 1,320,777 A | * | 11/1919 | Mayhew | 30/258 |
| 1,595,706 A | * | 8/1926 | Carlson | 30/262 |
| 2,908,076 A | * | 10/1959 | Veith et al. | 30/252 |
| 3,058,377 A | * | 10/1962 | Hardt | |
| 3,182,485 A | * | 5/1965 | Sund | 30/252 |
| 4,055,891 A | * | 11/1977 | Wick | 30/250 |
| 4,829,672 A | * | 5/1989 | Riebock | 30/250 |
| 4,910,870 A | * | 3/1990 | Chang | 30/252 |
| 5,826,338 A | * | 10/1998 | Chilton et al. | 30/252 |
| 5,974,670 A | * | 11/1999 | Hsieh | 30/252 |

* cited by examiner

Primary Examiner—Hwei-Slu Payer
(74) Attorney, Agent, or Firm—Browdy and Neimark

(57) ABSTRACT

A pair of shears comprises two pivotally-fastened handles, two blades pivoted to the handles, and a connection device pivoted with the two blades. The two handles are provided with a cutting edge. As the two handles are moved toward each other, the cutting edges and the blades are capable of bringing about independently a scissors action to execute the cutting of an object held therebetween.

4 Claims, 4 Drawing Sheets

SHEARS CAPABLE OF CUTTING SIMULTANEOUSLY A PLURALITY OF OBJECTS OF DIFFERENT DIMENSIONS AND PROFILES

FIELD OF THE INVENTION

The present invention relates generally to a hand tool for cutting an object, and more particularly to a pair of shears capable of cutting at the same time a plurality of objects of different dimensions and profiles.

BACKGROUND OF THE INVENTION

The conventional shears comprises two pivotally-fastened handles, two blades pivoted to the handles, and a joint pivoted with the blades. The blades and the handles are fastened pivotally such that the pivoting points are located at two sides of the pivoting point of the two handles. As the two handles are moved toward each other, the two blades bring about the scissors action to cut an object held between the two blades. In view of the cutting edges of the blades being linear, an object having an arcuate profile is apt to slip away from the blades at the time when the scissors action of the blades is brought about.

SUMMARY OF THE INVENTION

The primary objective of the present invention is to provide a pair of shears free from the drawback of the prior art shears described above.

It is another objective of the present invention to provide a pair of shears with means to cut simultaneously two or more objects different in dimension and profile.

In keeping with the principle of the present invention, the foregoing objectives of the present invention are attained by the shears comprising two handles, which are pivoted together and are provided with a cutting edge. Two blades are respectively pivoted to the handles and a connection device. Both the blades and the cutting edges are capable of cutting objects at the same time as the two handles are moved toward each other. The cutting edges are so designed as to cut an object having an arcuate profile.

The features and the advantages of the present invention will be more readily understood upon a thoughtful deliberation of the following detailed description of two preferred embodiments of the present invention with reference to the accompanying drawings.

DETAILED DESCRIPTION OF THE INVENTION

Figure 1:
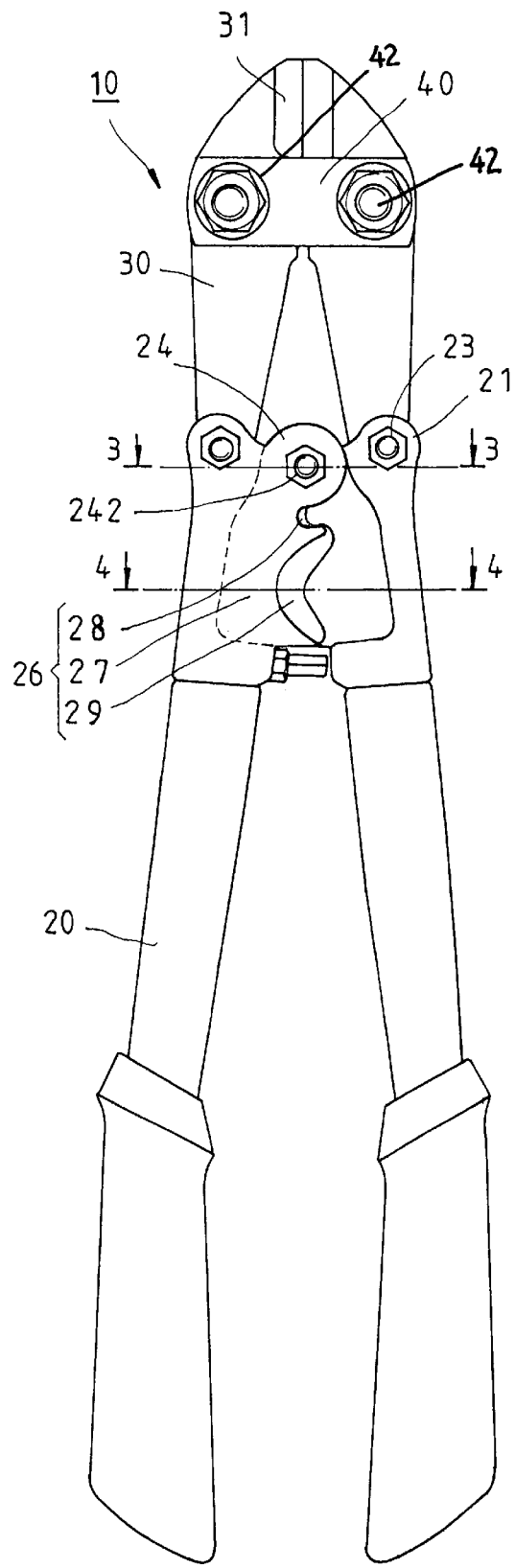
FIG. 1 shows a front view of a first preferred embodiment of the present invention.
Figure 3:
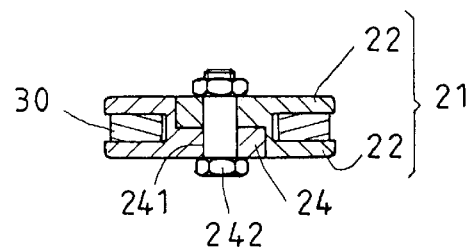
FIG. 3 shows a sectional view taken along the direction indicated by a line 3—3 as shown in FIG. 1.
Figure 4:
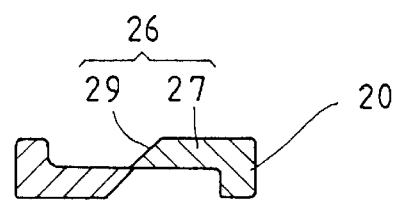
FIG. 4 shows a sectional view taken along the direction indicated by a line 4—4 as shown in FIG. 1.
Figure 2:
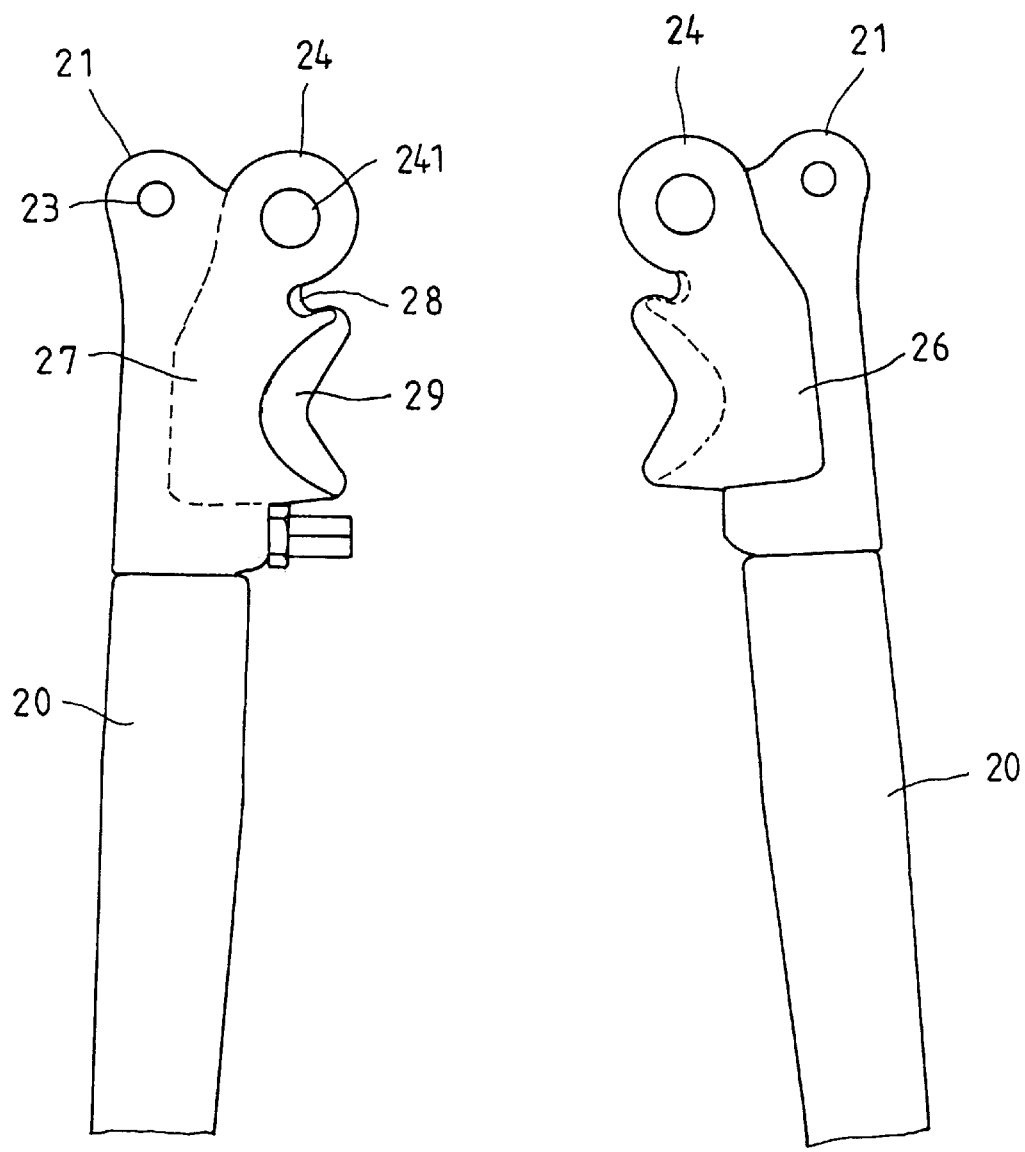
FIG. 2 shows a partial exploded view of the first preferred embodiment of the present invention.

As shown in FIGS. 1–4, a pair of shears 10 embodied in the present invention comprises two handles 20, two blades 30, and a connection device 40.

The two handles 20 are provided with a first pivoting portion 21 located at one end of the handles 20, a second pivoting portion 24 extending laterally from the first pivoting portion 21, and a cutting edge 26 extending from the first pivoting portion 21. The two second pivoting portions 24 are provided correspondingly with a through hole 241. The two handles 20 are pivoted together by a pivot 242 which is received in the through holes 241. The first pivoting portions 21 are provided with two fixation pieces 22 parallel to each other and having a through hole 23. The cutting edges 26 are provided with a cutting piece 27 thinner than the handles 20 and extending from the handles 20, a first indentation 28 indenting into the cutting piece 27, and a second indentation 29 contiguous to the first indentation 28 and greater in dimension than the first indentation 28. The two handles 20 are symmetrical in form to each other. The two blades 30 are pivoted to the first pivoting portions 21 of the handles 20 by a pivot received in the through holes 23. The blades 30 are provided with a cutting edge 31. The two cutting edges 31 of the blades 30 are opposite to each other.

The connection device 40 comprises two pivoting pieces 42, which are pivoted with the blades 30.

Figure 5:
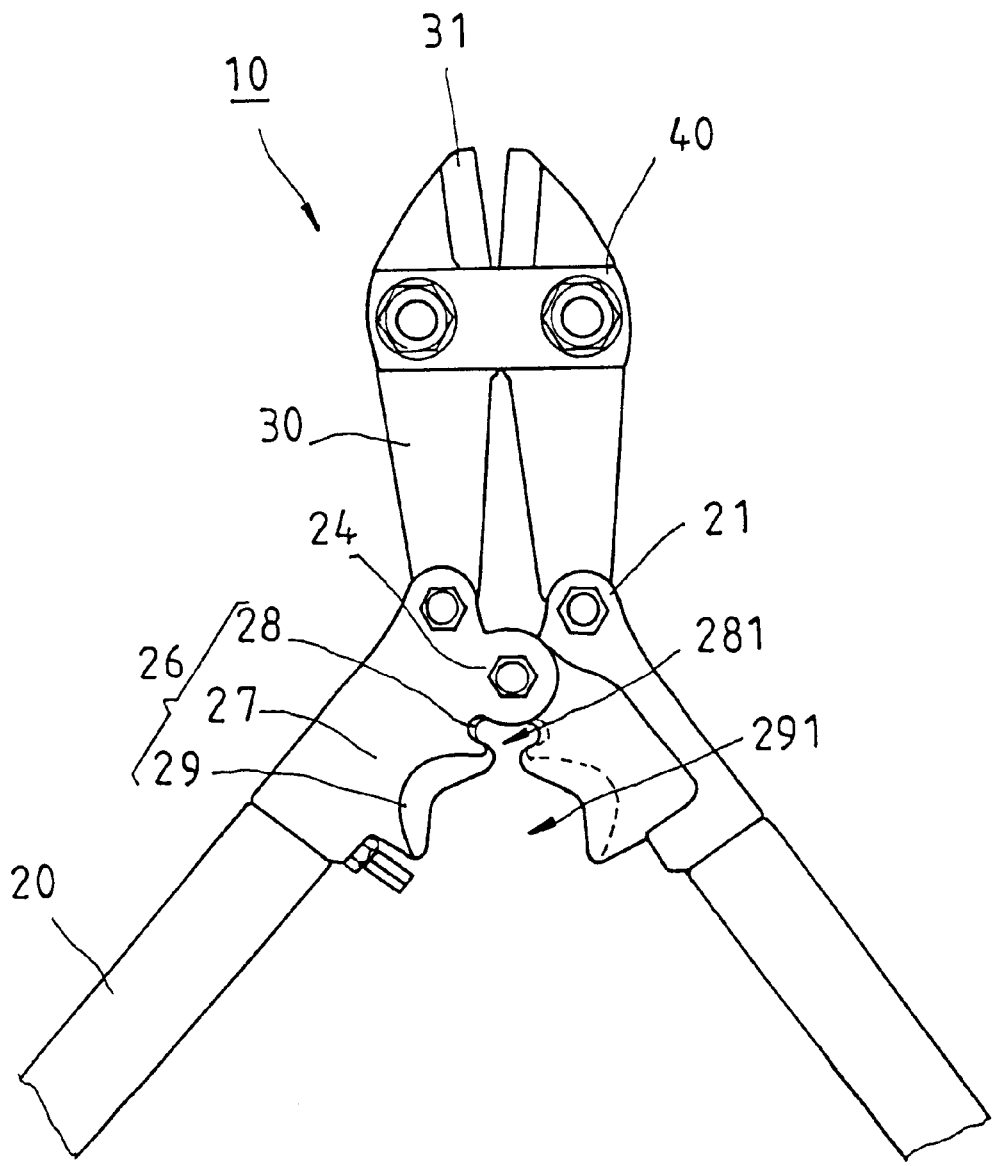
FIG. 5 shows a schematic view of the first preferred embodiment of the present invention in diction.

In operation, as the two handles 20 are moved away from each other, the two blades 30 also move away from each other in light of lever motion. An object is disposed in the space between the two blades 30. When the two handles 20 are moved toward each other, the object is cut by the two blades 30. The present invention is characterized by the two cutting edges 26, which move away from each other at the time when the two handles 20 are moved away from each other. As a result, a first space 281 is formed by the two first indentations 28 while a second space 291 is formed by the two second indentations 29, as shown in FIG. 5. The first space 281 and the second space 291 are different in dimension from each other for cutting steel wires or cables of different dimensions.

Figure 6:
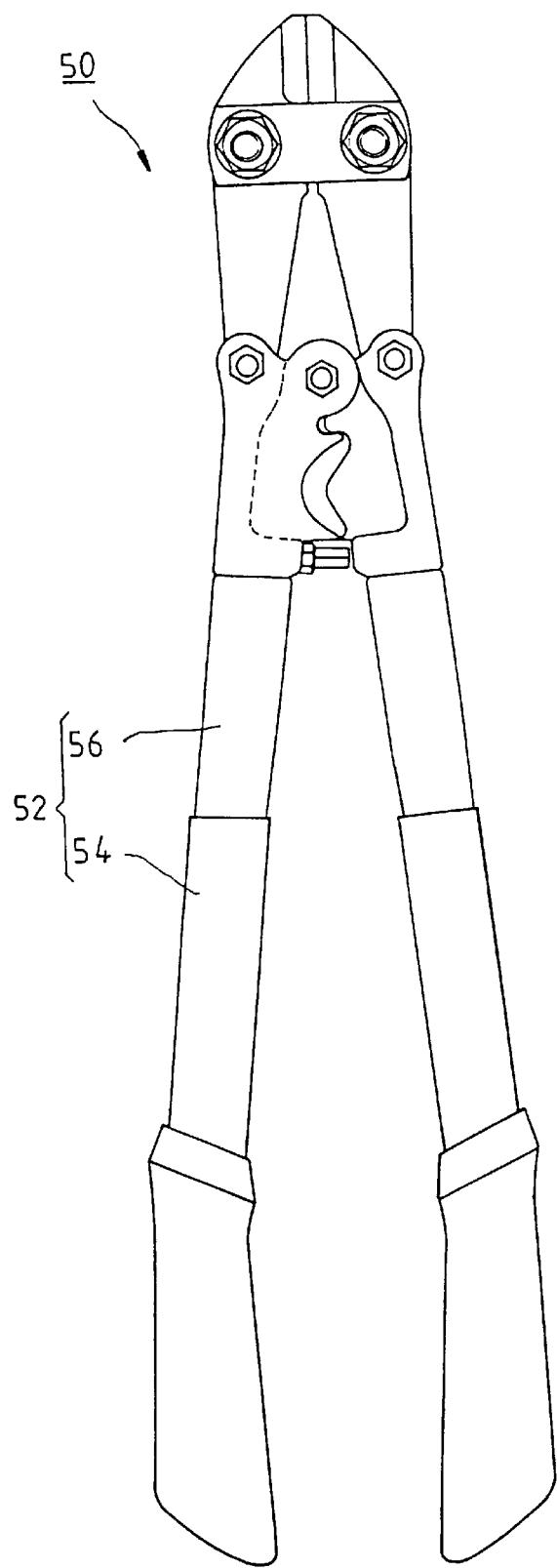
FIG. 6 shows a front view of a second preferred embodiment of the present invention.

As shown in FIG. 6, a pair of shears 50 of the second preferred embodiment of the present invention is basically similar in construction to the shears 10 described above, except that the former comprises two handles 52 which are formed of an outer tube 54 and an inner tube 56. The inner tube 56 is slidably fitted into the outer tube 54, thereby enabling a user of the shears 50 to adjust the length of each handle 52.

What is claimed is:

1. A pair of shears comprising:
   two handles pivotally connected to each other and each provided with a cutting edge whereby said cutting edges of said two handles are opposite to each other;
   two blades each pivotally connected to a respective one of said handles; and
   a connection device pivoted with said two blades;
   said two cutting edges and said two blades being capable of bringing about independently a scissors action at such time when said two handles are moved toward each other, and
   wherein said cutting edges are provided with at least one indentation to hold in place an object to be cut by said two cutting edges.

2. The pair of shears as defined in claim 1, wherein said cutting edges are best provided with two indentations.

3. The pair of shears as defined in claim 2, wherein said two indentations are different in dimension and shape.

4. The pair of shears as defined in claim 1, wherein said two handles are formed of an outer tube and an inner tube whereby said inner tube is slidably fitted into said outer tube.

* * * * *